(12) United States Patent
Mundy et al.

(10) Patent No.: US 9,284,213 B2
(45) Date of Patent: Mar. 15, 2016

(54) PRODUCTION OF SILICA SOOT BODIES

(75) Inventors: Alan Mundy, Ponteland (GB); Ian George Sayce, Stocksfield (GB)

(73) Assignee: Heraeus Quartz UK Limited, Wallsend, Tyne and Wear (GB)

( * ) Notice: Subject to any disclaimer, the term of this patent is extended or adjusted under 35 U.S.C. 154(b) by 221 days.

(21) Appl. No.: 14/009,817

(22) PCT Filed: Apr. 3, 2012

(86) PCT No.: PCT/EP2012/056113
§ 371 (c)(1),
(2), (4) Date: Dec. 26, 2013

(87) PCT Pub. No.: WO2012/136678
PCT Pub. Date: Oct. 11, 2012

(65) Prior Publication Data
US 2014/0106094 A1    Apr. 17, 2014

(30) Foreign Application Priority Data
Apr. 8, 2011   (GB) .................................. 1106015.9

(51) Int. Cl.
*C03B 37/014* (2006.01)
*C03B 19/14* (2006.01)

(52) U.S. Cl.
CPC ........... *C03B 37/014* (2013.01); *C03B 19/1492* (2013.01); *C03B 37/01493* (2013.01); *C03B 2207/36* (2013.01); *C03B 2207/52* (2013.01); *C03B 2207/54* (2013.01); *C03B 2207/70* (2013.01); *Y10T 428/131* (2015.01)

(58) Field of Classification Search
CPC .............. C03B 37/014; C03B 19/1492; C03B 37/01493; C03B 2207/36; C03B 2207/52; C03B 2207/54; C03B 2207/70; Y10T 428/131
See application file for complete search history.

(56) References Cited

U.S. PATENT DOCUMENTS

| | | | |
|---|---|---|---|
| 2,239,551 | A | 4/1941 | Dalton et al. |
| 2,272,342 | A | 2/1942 | Hyde |
| 2,326,059 | A | 8/1943 | Nordberg |
| 3,806,570 | A | 4/1974 | Flamenbaum et al. |
| 3,933,453 | A | 1/1976 | Burke et al. |
| 4,253,863 | A | 3/1981 | Iyengar |
| 4,388,094 | A | 6/1983 | Carpenter et al. |

(Continued)

FOREIGN PATENT DOCUMENTS

| | | |
|---|---|---|
| EP | 0163752 A1 | 12/1985 |
| JP | 62-108748 A | 5/1987 |

(Continued)

OTHER PUBLICATIONS

Vincent Petit et al., "Experimental Study of SiO2 Soot Deposition using the Outside Vapor Deposition Method", Aerosol Science and Technology, vol. 44, Issue 5, pp. 388-394, Mar. 2010.

*Primary Examiner* — Michael C Miggins
(74) *Attorney, Agent, or Firm* — Howson & Howson LLP

(57) ABSTRACT

Processes for the manufacture of a hollow cylindrical porous body of synthetic vitreous silica soot by outside vapor deposition on a mandrel are described, in which the temperature of the mandrel is controlled to be substantially constant throughout the deposition process. In preferred embodiments, the mandrel is composed of metal or metal alloy. Hollow ingots of pure or doped synthetic vitreous silica glass manufactured by such processes are also described.

34 Claims, 1 Drawing Sheet

(56) References Cited

U.S. PATENT DOCUMENTS

| | | |
|---|---|---|
| 5,180,410 A | 1/1993 | Berkey |
| 5,713,979 A | 2/1998 | Nicholson et al. |
| 5,735,928 A | 4/1998 | Sayce et al. |
| 5,766,291 A | 6/1998 | Sato et al. |
| 5,985,779 A | 11/1999 | Sayce et al. |
| 6,763,682 B1 | 7/2004 | Sayce et al. |
| 7,677,058 B2 | 3/2010 | Hawtof et al. |
| 8,959,957 B2 | 2/2015 | Coapes et al. |
| 2005/0187092 A1 | 8/2005 | Bookbinder et al. |
| 2006/0059948 A1 | 3/2006 | Sato et al. |
| 2006/0107693 A1 | 5/2006 | Trommer et al. |
| 2008/0066497 A1 | 3/2008 | Weber et al. |
| 2008/0295541 A1 | 12/2008 | Otosaka |
| 2009/0104454 A1 | 4/2009 | Sayce |
| 2010/0081554 A1 | 4/2010 | Huenermann |
| 2010/0291346 A1 | 11/2010 | Hawtof et al. |
| 2011/0072852 A1 | 3/2011 | Krause et al. |
| 2013/0045854 A1 | 2/2013 | Coapes et al. |
| 2013/0115391 A1 | 5/2013 | Coapes et al. |

FOREIGN PATENT DOCUMENTS

| | | |
|---|---|---|
| JP | S62-108748 A | 5/1987 |
| JP | H04-240126 A | 8/1992 |
| JP | 04-243931 A | 9/1992 |
| JP | H07-149526 A | 6/1995 |
| JP | 09-286621 A | 11/1997 |
| JP | 2002-220234 A | 8/2002 |
| JP | 2004-269284 A | 9/2004 |
| JP | 2010-229029 A | 10/2010 |

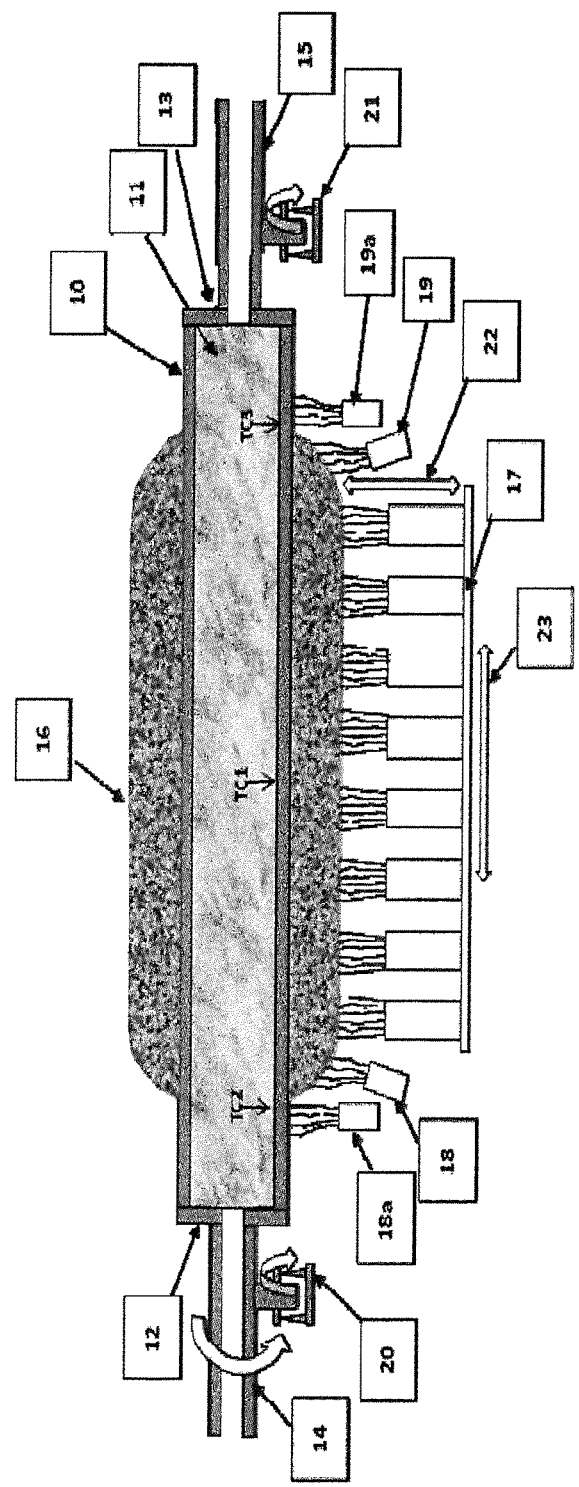

PRODUCTION OF SILICA SOOT BODIES

The manufacture of hollow cylindrical bodies of synthetic vitreous silica is a well-known process of great importance in the production of optical fibres and high quality optical materials. One of the most widely used techniques is the so-called Outside Vapour Deposition (OVD) process, in which silica soot is generated in the flame of one or more burners fed with a chosen silica precursor, usually in the form of vapour but sometimes in the form of an aerosol spray. The precursor is converted in the flame by oxidation or hydrolysis into a stream of nanoparticles of silica, and this stream is directed at a rotating substrate or mandrel on which the particles collect as a porous silica soot body. On completion of the deposition process, and after cooling, this soot body may be removed from the substrate, and may be subsequently heated in a chlorine-containing atmosphere for dehydration or removal of any metallic impurities. Thereafter the porous silica body may be sintered under vacuum or in an atmosphere of helium to make a hollow cylinder of pore-free synthetic silica glass. Variations of this process exist for specific applications whereby it is possible to dope the silica or otherwise to adjust the content of dissolved species, in order to modify the properties of the glass in a variety of ways.

The mandrel must be able to support the weight of the soot body, but it must also be capable of withstanding the environmental conditions which exist during the deposition process, including contact with the gaseous reaction products and silica, at local deposit temperatures typically in the range 600-1,100° C., and flame temperatures which are very much higher, without mechanical failure or reaction such as would weaken the mandrel or lead to unacceptable contamination of the silica body. To meet these requirements, recrystallised alumina has been commonly used as a deposition mandrel, as have been certain other oxidation-resistant refractory ceramics, including silicon carbide, silicon-impregnated silicon carbide, silicon carbide coated graphite, etc.

As soot deposition processes have come to be used at ever larger scale, mandrels of larger diameter have been required. Suitable cylinders or tubes of the aforementioned ceramic materials have been found to be either very expensive or even unobtainable. Furthermore, where they have been used, long large diameter ceramic tubes have proved to be fragile and at high risk of breakage, and thus to contribute significantly to the overall cost of the product. An alternative substrate material would therefore be highly desirable.

It might appear that a metal mandrel could be used in the OVD process, but there are a number of reasons why the use of such mandrels has been very limited. (In the text below the term metal will be taken to include metallic alloys, which incorporate a mixture of metallic and non-metallic ingredients, and the words metal and alloy will be used interchangeably).

Metal deposition substrates were mentioned as an option for the earliest small-scale studies of the manufacture of pure and doped synthetic silica via soot deposition and sintering (see, for example, U.S. Pat. No. 2,239,551, U.S. Pat. No. 2,272,342 and U.S. Pat. No. 2,326,059). At that time (1941-43), it was suggested that one could use a mandrel made from "nickel, or other non-scaling refractory metal", but there is no evidence that such mandrels have ever been adopted in industrial practice, except for small-scale applications.

Some of the problems of using a metal mandrel are summarised in U.S. Pat. No. 3,806,570, in which the use of an air-cooled aluminium mandrel to make small crucibles via soot deposition and sintering was discussed. It appears that the process could only be used for small vessels. The size was limited to crucibles of height 50 mm, outside diameter 50 mm, and wall thickness 2 mm, and it was impossible to make articles with thicker walls. It seems that these limitations were due to the great difference in expansion coefficient of the metal mandrel relative to the silica soot, leading to cracking of the latter. To avoid these problems, it was proposed in this patent that the deposition mandrel should be made of a non-metallic refractory material. Graphite was used, but alternatives suggested included ceramics such as alumina, mullite, boron nitride and silicon carbide. It was furthermore suggested that one could use the same mandrel both for deposition and subsequent sintering; however, this has not become a regular practice in the industry.

The possibility of a metal mandrel was again reported in U.S. Pat. No. 3,933,453. Here it was proposed that silica soot be deposited on a mandrel whose outer surface was made from a foil, a tightly wound coil of wire or a gauze, made of a suitable refractory metal. It was envisaged that this metal mandrel could be used not only for soot deposition, but also for supporting the silica during the consolidation process. The metals named included platinum, tantalum, niobium, tungsten, rhenium, and stainless steel, but the only material used in practice was platinum, either in the form of wire wound round an alumina mandrel, or as foil supported on a layer of aluminosilicate fibre, wrapped round an alumina mandrel.

U.S. Pat. No. 4,388,094 describes another example of soot deposition on a metal mandrel. In this case the mandrel took the form of a slightly tapered cone. Soot was deposited on this cone to build up several layers. The burner was then stopped for a time while the mandrel cooled. As a result of such cooling, and of the greater coefficient of thermal expansion (and thus greater contraction upon cooling) of the mandrel compared to the soot body, the soot body became detached. It was then moved a short distance in an axial direction, and the process was repeated, such that the newly deposited soot was again deposited on the metal mandrel, but also overlapped and became attached to the material deposited earlier. By repeating these steps it was possible to form a continuous length of tube, made from silica soot. The preferred metal for this application was said to be platinum, and experiments were undertaken using a thin foil of platinum, supported on a stainless steel carrier. In this way it was said to be possible to produce a synthetic silica tube of outside diameter 25 mm, and wall thickness 2.8 mm. It is not known whether this process ever became commercially viable, but the cost of a composite metal mandrel of the type described in this patent, with coating of platinum foil suitable for a large scale OVD process, would be prohibitive.

Despite these past attempts to use metal mandrels, it is now conventional to use mandrels composed of the refractory ceramic materials noted above. Recrystallised alumina is typically utilised.

For certain applications large diameter mandrels are now required, for example for making near-net-shapes for use in the manufacture of semiconductor jigs, as proposed in co-pending patent application GB 1011582.2. In such an application a mandrel several meters long is required, of diameter 300 mm or more. The use of such a mandrel in refractory ceramic material, if available, would lead to an unacceptable cost of manufacture. However, there would be major cost savings if it were possible to replace such a fragile large diameter ceramic mandrel with a robust mandrel made from refractory metal. While oxidation-resistant precious metals such as platinum, rhodium etc. could be considered, it would be more cost-effective to employ less expensive oxidation- and temperature-resistant metals such as stainless steel, titanium, titanium alloys or one of the more specialised superalloys (including, for example, those available under the trade marks or general names Hastelloy, Inconel, Waspaloy, Rene alloys, Haynes alloys, Incoloy and Fecralloy).

As noted above, previous references to the deposition of silica soot on metal mandrels appear in the earliest literature relating to the manufacture of small shapes in synthetic vitreous silica. There is no record in recent literature of the use of metal mandrels for producing substantial tubular silica soot bodies, and there are two major reasons for this. First, the general use of silicon tetrachloride and other halides as silica precursors means that any metal substrate must operate in a high temperature environment in the presence of highly corrosive species such as chlorine and hydrochloric acid. This environment precludes the use of any metal which may be attacked by such vapours, as such attack would both limit the life of the substrate and risk unacceptable contamination of the deposited silica. Secondly, the high coefficient of thermal expansion (CTE) of the available metals or alloys is mismatched with the substantially lower CTE of vitreous silica.

The temperature range experienced by these materials in the course of the deposition process has in the past been found to preclude their use for larger products, owing to the difficulty of supporting a delicate silica soot body (CTE approximately $4.5 \times 10^{-7}/°$ C.) on a mandrel of significantly greater CTE (stainless steel alloys 10 to $16 \times 10^{-6}/°$ C.; Inconel alloys typically around $13 \times 10^{-6}/°$ C.; Hastelloy alloys typically around $13 \times 10^{-6}/°$ C.; Fecralloy around $12 \times 10^{-6}/°$ C.; titanium $8.5 \times 10^{-6}/°$ C.). Any previous attempts would have been hampered by the significant differential expansion between silica and the metal substrate during the thermal cycling which occurs during the build up of a substantial layer of soot on the mandrel, and even with each cycle of oscillation and/or rotation of the mandrel relative to the soot deposition burner or burner array. This would have resulted in cracking of the silica soot, such that it has in the past been impossible to manufacture large porous silica shapes using a metal mandrel, even if contamination arising from contact with the metal or with products of attack of the metal by corrosive reaction products could be avoided or accepted.

The present invention seeks to provide solutions to the problems which have prevented successful use of metal mandrels in the past. In particular, it addresses the problem of differential expansion, which leads to cracking of large soot shapes. As a subsidiary feature, it also addresses the issue of corrosion of the mandrel, leading to unacceptable contamination of the silica product.

The present inventors have now found that, by appropriate equipment design and the introduction of novel techniques of mandrel temperature control, it is possible to overcome past problems and successfully to make large diameter soot bodies using a metal mandrel. In the methods provided by the present invention, the key to success is careful control of the temperature of the mandrel during the deposition process, so that the temperature does not vary (outside narrow acceptable bounds) throughout the whole of the deposition process. Furthermore, while the invention relates in one particular aspect to the use of mandrels composed of metal or metal alloys, it has been established that the advantages of the invention are not restricted to the use of metal mandrels: the manufacturing process devised by the inventors may also advantageously be used with mandrels composed of other substances, such as conventional ceramic materials.

The invention therefore provides, in one aspect, a process for the manufacture of a hollow cylindrical porous body of synthetic vitreous silica soot by outside vapour deposition on a mandrel, wherein the temperature of the mandrel is controlled to be substantially constant throughout the deposition process. Preferably, the mandrel temperature remains substantially constant and uniform over the entire length of the deposition zone.

As described in more detail below, in many embodiments the mandrel is composed of metal or metal alloy. In such embodiments, it is preferred that the temperature at the surface of the mandrel does not exceed such a temperature as would lead to an undesirable oxidation of the metal or alloy, with the possibility of unacceptable contamination of the silica soot with which it is in contact.

Control of temperature may be achieved by several means. For instance, the temperature of a selected portion or portions of the mandrel (in particular, a region upon which soot is deposited during the deposition process and the region at each end of the soot deposit) may be monitored throughout the deposition process. However, once a reliable deposition regime has been established, subsequent control of temperature may be adequately achieved by continuation or repetition of that regime, without the need for further temperature monitoring.

Adjustment of temperature may conveniently be carried out by controlling the flows of silica precursor material and fuel gas to the synthesis burner(s) used to create the silica soot and/or by adjustment of the distance between the burner(s) and the surface of the soot body. The range of temperature permissible during the process will depend on the mandrel diameter and length over which soot is deposited. Particularly good results may be achieved if the temperature of the mandrel in the region of the ends of the soot deposit is maintained to within 50° C., or preferably within 25° C., or more preferably within 5° C., of the temperature in that region at the commencement of deposition and/or when the temperature of the mandrel in any region which is covered by the soot deposit is maintained to within 50° C., or preferably within 25° C., or more preferably within 5° C., of the temperature in that region at the commencement of deposition.

In some cases it may be desirable to provide additional burners, fed only with combustion gases and not supplied with silica precursor, in the vicinity of the ends of the deposited silica and/or the bare mandrel adjacent thereto. Such burners may serve to densify the deposited silica at the ends of the soot body, and to control the temperature of the mandrel.

In some embodiments, control of mandrel temperature may be provided or facilitated by alternative heating means. For example, the mandrel may be hollow and provided with internal electrical heating means, such as one or more electrical heating elements.

Optionally, the mandrel may also be provided with cooling means. For example, when a hollow mandrel is used, cooling may be provided by a flow of air or other coolant fluid, fed to the interior of the mandrel.

Processes according to the invention make it possible to use metal mandrels of substantial diameter (for example, those of external diameter greater than 50 mm, or preferably greater than 100 mm, or more preferably greater than 300 mm) for the deposition of silica soot to manufacture hollow soot bodies. Thus, although it is not essential for the operation of the invention, it is preferred that the mandrel be composed wholly (or at least substantially) of metal. The mandrel may, for example be composed of a hollow metal tube, which may contain thermally insulating material. Such a tube is preferably seamless but if of welded construction it is advantageous that the welded seam be ground to conform to the smooth cylindrical surface of the tube with appropriate surface finish. A suitable surface finish has been found to be 1.6 micron $R_a$ but both higher and lower quality surface finishes may be employed.

Good results have been achieved using a mandrel made from a refractory oxidation-resistant metal (which term, as noted above, is to be taken to include alloys). Suitable metals include stainless steel, titanium, titanium alloys and the more specialised superalloys (such as those available under the trade marks or general names Hastelloy, Inconel, Waspaloy, Rene alloys, Haynes alloys, Incoloy and Fecralloy).

For many applications, such alloys may be used without special coatings. In certain embodiments, therefore, the outer surface of the mandrel, upon which deposition of silica soot takes place, is composed substantially of metal, either with or without an outer oxide layer (which may, for example, be a naturally occurring oxide layer). Such oxide layers are generally thin, typically less than 10 µm in thickness, frequently less than 1 µm or even 0.1 µm thick.

However, in other embodiments it may be desirable to provide a protective layer of metallic oxide or nitride, or to subject the mandrel to a special surface treatment or coating technique, for example cementation, chemical vapour deposition, ion plating, plasma enhanced vapour deposition, sputtering, thermal spray coating, etc. Such surface treatments and coatings are preferably chosen for their resistance to oxidation, and for resistance to corrosion and spalling under the rigorous conditions of thermal cycling and high temperature contact with silica soot. In certain embodiments, the abovementioned refractory metals may be coated via physical vapour deposition with thin layers of oxidation resistant coatings such as aluminium titanium nitride, silicon titanium nitride etc. Alternatively, they may be treated to enhance the presence of silicide or aluminide at the surface of the metal. These materials oxidise superficially to provide a non-contaminating release layer which inhibits diffusion of impurities from the metal substrate into the deposited silica, and permits removal of the soot with minimal contamination by any component of the mandrel material. In the present application it is preferable that any such additional protective coating layer be less than 150 µm thick if delamination is to be avoided, and barrier layers of thickness less than 10 µm appear to be preferable.

The silica soot particles are typically produced in the flame of a synthesis burner, fed with a chlorine-free precursor of silica. Potential chlorine-free precursors include:

silanes of general formula $SiR^1{}_nH_{(4-n)}$ (where $R^1$ is one or more aliphatic hydrocarbon groups, and n is an integer from 0 to 4), linear siloxanes of general formula $R^2{}_3(Si-O-Si)_mR^2{}_3$ (where $R^2$ is hydrogen or an aliphatic hydrocarbon group, and m is an integer of at least 1), cyclic siloxanes of general formula $R^3{}_2(Si-O)_nR^3{}_2$ (where $R^3$ is hydrogen or an aliphatic hydrocarbon group, and n is an integer typically of 3 to 5), and alkoxysilanes of general formula $R^1{}_nSi(OR^2)_{4-n}$ (where $R^1$ and $R^2$ are aliphatic hydrocarbon groups, and n is an integer of 0 to 3).

Using such precursors, it has proved possible to minimise or even to avoid any problems due to corrosion of an appropriate oxidation-resistant metal mandrel. Other chlorine-free silicon compounds exist (e.g. silazanes, etc.) and could be used as silica precursors if their physical properties are appropriate, and the cost is acceptable.

Of these potential precursors it has been found that the polymethylsiloxanes are particularly suitable as silica precursors. These include the linear siloxane hexamethyldisiloxane (HMDS), and the cyclic polymethylsiloxanes octamethylcyclotetrasiloxane (OMCTS) and decamethylcyclopentasiloxane (DMCPS). These polymethylsiloxanes, and their mixtures, are preferred precursors for the present process.

The feed to the synthesis burner(s) may additionally be supplied with one or more dopants (for instance chlorine-free organometallic dopant compounds), where a doped product is desired. Dopants such as volatile metal chelates and metal alkoxides may, for example, be used.

The invention also extends to hollow ingots of synthetic vitreous silica glass manufactured by processes as described above, and especially to those of internal diameter greater than 50 mm, or preferably greater than 100 mm, or more preferably greater than 300 mm.

The invention is hereinafter described in more detail by way of example only, with reference to the accompanying drawing, in which:

FIG. 1 is a schematic representation of an embodiment of apparatus suitable for use in a method according to the invention.

Referring to FIG. 1, the mandrel (10) is made from one of the refractory metals noted above, for example stainless steel 316 or Hastelloy C-4. The oxidation resistance of stainless steel may be enhanced by suitable coating or alternative treatment, for example Minimox™ (offered by Material Interface Ltd, Sussex, Wis., USA). It is preferable that the mandrel has a smooth and regular surface finish, and that there are no discontinuities, such as weld seams apparent. While a surface roughness $R_a$ of 1.5 µm has proved adequate, for some purposes it may be advantageous to employ a mandrel of superior smoothness, or to subject the mandrel to electropolishing prior to use. Insulation (11), composed of alumina fibre, is provided within the hollow mandrel, to prevent excessive heat loss to the end-plates (12, 13) of the mandrel. Aluminosilicate fibre or other suitable refractory oxide fibres may alternatively be used as the insulating material, and in some embodiments the insulation may be omitted. The mandrel is supported via end-plates (12, 13) by shafts (14, 15), which may be cooled by circulation of water or other means, and which permit rotation about the axis of the assembly.

The soot body (16) is built up by deposition from an array of burners (17). In alternative arrangements, a single burner could be employed, for example a linear burner of the type described in U.S. Pat. No. 5,735,928. End burners (18, 18a, 19, 19a) are provided to densify the deposited silica at the ends of the soot body, and to control the temperature of the metal mandrel. In some embodiments it may be possible to operate with a single burner at each end of the soot body, however it has been found advantageous to operate with two or more end burners at each end of the deposition zone, since this permits better densification of the ends of the porous soot body, and independent control of the temperature of the mandrel in this region. This consideration becomes increasingly important for the manufacture of large diameter, thick wall soot bodies.

In certain embodiments, the equipment takes the form of a lathe in which the mandrel and support shafts are held by chucks. In an alternative embodiment, as illustrated, the shafts may be mounted in contact with drive rollers (20, 21), which are in turn mounted on load cells, permitting on-line weighing of the mandrel assembly, together with the deposited silica soot.

As indicated by arrow 22, means (not shown) are provided for moving the mandrel progressively away from the burner array, either by raising the mandrel, or by lowering the burners, to ensure that an optimal distance is maintained between the burners and the surface of the growing soot body. Such means may, for example, comprise a set of screw jacks which may be adjusted manually or automatically as the soot body grows in size. Again, as indicated by arrow 23, means (not shown) are provided to permit relative reciprocating motion between burners and mandrel, and this oscillation ensures a uniform deposit of soot. For example the burners may be mounted on a carriage which is moved to and fro in the course of the process.

The temperature of the metal mandrel is monitored in several locations, preferably in at least three zones corresponding to the centre and two ends of the soot deposit, using thermocouples mounted within the mandrel (TC1, TC2, and TC3). These are arranged to report to monitoring equipment by suitable means (radio, slip rings, etc.) and permit accurate temperature monitoring at each of these locations throughout the deposition run.

Finally, the diameter of the soot body is monitored by means of a laser gauge, video camera or other suitable means (not shown), and the reading may be used to adjust the burner-to-substrate distance, and also to permit calculation of the mean density of the deposited soot, as well as to enable an estimate to be made of the dimensions of the product glass cylinder after sintering.

The mode of operation is described in the following typical example, employing an array of eight coaxial oxy-hydrogen burners fed with OMCTS vapour as silica precursor.

EXAMPLE

The mandrel (10) is made from a tube of stainless steel or other refractory metal of external diameter 300 mm, and length of 1200 mm, supported on shafts (14, 15) extending from each end. The shafts rest on drive rollers, which incorporate load cells permitting weighing of the mandrel and the deposited soot. The rollers may be raised or lowered, permitting precise control of the distance between the burners and the surface of the soot body as it grows in diameter. Heating and soot deposition are provided by eight coaxial oxy-hydrogen synthesis burners fabricated from quartz glass and spaced at intervals of 110 mm beneath the mandrel, and arranged to oscillate, over an amplitude of for example 110 mm during operation. At each end of the deposition zone are placed two oxy-hydrogen end burners, which serve to maintain the temperature of the end caps of the deposit, and also of the mandrel itself. Mandrel temperature is monitored throughout the run using three thermocouples mounted within the mandrel as described above.

The run commences with oxy-hydrogen flames only, to pre-heat the mandrel to operating temperature, e.g. 700° C. Flows to the end burners are adjusted so that all three thermocouples are brought to the same temperature (+/−5° C.), ensuring that the entire length of the deposition zone of the mandrel is at a known and specified temperature. In the case of a stainless steel mandrel, this may lead to an extension in the length of the mandrel by approximately 13 mm, and in diameter by approximately 3.3 mm.

After some 30 minutes, during which these temperatures are stabilised, OMCTS vapour is progressively introduced to the flame together with a carrier gas which may be an inert gas (e.g. nitrogen or argon), an oxidising gas (e.g. air or oxygen) or a mixture. At the same time the flow of hydrogen to the burners is progressively reduced to avoid heating the mandrel to a higher temperature, which would cause further expansion in length and diameter. From this time during the run, the flows of hydrogen to both deposition and end burners are adjusted to ensure that, as the soot thickness increases, and as the burner to mandrel distance is adjusted accordingly, the temperature of the mandrel at the centre and ends remains within pre-determined limits at the approximate value established before soot deposition commenced (e.g. +/−5° C.). In this way it is possible to ensure that throughout the length of the deposited soot the metal mandrel does not expand significantly in diameter or length (which would lead to cracking of the soot body) or contract (which could cause the soot body to become detached from the mandrel).

The deposition process continues in this way until the required soot thickness or weight has been achieved, according to the required final product. Then the flow of precursor vapour is reduced to zero, and the surface of the soot body is heated by oxy-hydrogen flames alone. Finally, these flames are progressively reduced, and the soot body is allowed to cool naturally. During this cooling process the metal mandrel contracts, so that the soot body may be readily separated from the mandrel.

It has been found that under the above conditions there is no problem of adhesion of soot body to the mandrel on cooling, as commonly occurs with large diameter ceramic mandrels and which may cause severe difficulty in removing the soot body, and risk fracture of the brittle ceramic substrate. The present invention thus provides an economically viable alternative to the ceramic mandrels employed conventionally for OVD processes, when used to manufacture hollow cylindrical bodies of porous synthetic silica. By employing an appropriate metal or alloy, optionally after applying a suitable coating or surface treatment, and when using a chlorine-free silicon precursor, contamination due to contact between silica and mandrel has been found to be negligible. However, if for a specific application any such contamination were to be regarded as significant, it could be eliminated later either by chlorination (i.e. heating the porous body in a chlorine-containing atmosphere prior to sintering), by machining or etching the inner surface of the product glass cylinder, or by a combination of such treatments.

While the monitoring and control of the local temperature of the metal mandrel is essential during the development phase of any deposition process using such a mandrel, it may be possible thereafter to programme the flows of the various gases to a predetermined schedule to provide a given product size without further reference to temperature measurements. But under such circumstances it remains important to ensure that the various gas flows are maintained at levels which ensure that the mandrel temperature along the length of the deposition zone is maintained at substantially the same temperature from start to finish of the deposition process. The use of such an operating procedure may permit the use of metal mandrels over a wide range of diameters, e.g. from 50 mm diameter up to 300 mm and beyond, and has been found to be of particular benefit for such large diameter applications.

As described in the above example, the metal mandrel may be used with oxy-hydrogen burners of coaxial design, supplied with OMCTS vapour as precursor; however, the application of the present invention is not limited to these conditions. Alternative fuels may be used, including natural gas, methane, propane, butane etc., and alternative burner designs are also possible, including metal burners, and linear burners extending over the full length of the deposition zone. Again, alternative chlorine-free precursors may be used and, with suitable burner designs, it may be possible to feed the precursor or precursors as a spray of atomised liquid droplets, as an alternative to vapour feed.

While the use of the metal mandrel for an OVD process has been described above in terms of the manufacture of pure synthetic silica, the present invention is also suitable for the manufacture of silica glass bodies doped with one or more metal oxides. In this case, it is preferable that the precursor for any dopant oxides be provided in the form of the vapour, or an atomised spray, of an appropriate chlorine-free organometallic precursor compound, thus avoiding the generation of corrosive halogen-containing gases which might lead to corrosion of the metal mandrel. In principle, there exists a wide range of potential chlorine-free precursor compounds but, because of their availability, some of the most convenient are the metal alkoxides (e.g. titanium isopropoxide) and chelates (for example metal pentanedionates, etc.). Thus, for example, by feeding the burner or burner array, with the mixed vapours of OMCTS and titanium isopropoxide, it is possible to deposit silica soot doped with titania onto the metal mandrel of the present invention, and on sintering the soot body so formed, to obtain a titanium-doped silica glass of controlled ultra-low coefficient of thermal expansion. In a similar manner it is possible to manufacture other silica glasses doped with many other metals, while employing a metal mandrel as substrate for deposition via the OVD process.

The present inventors have found that, when using the preferred chlorine-free precursors in the above OVD process, there is surprisingly little contamination of the deposited silica soot when operating with suitable substrate temperature and depositing on the surface of an appropriate refractory metal or alloy. On heating during the deposition process such metals become protected by a layer of mixed metal oxides, the nature of which is generally determined by the components of the alloy, but in the present circumstances this layer may be supplemented by some additional silica, derived from the deposition process. The initial oxide layer is generally less than 1 μm thick, but may become somewhat thicker on continued use as a deposition substrate.

The particular examples described above are intended to be illustrative of the invention and do not restrict its scope. Further modifications will readily suggest themselves to those skilled in the art, and all such modifications are intended to be within the scope of the appended claims.

The invention claimed is:

1. A process for the manufacture of a hollow cylindrical porous body of synthetic vitreous silica soot by outside vapour deposition on a mandrel, wherein the temperature of the mandrel is controlled to be substantially constant throughout the deposition process.

2. A process according to claim 1, wherein the temperature of the mandrel in a region of ends of soot deposit is maintained to within 50° C. of the temperature in that region at commencement of deposition.

3. A process according to claim 1, wherein the temperature of the mandrel in a region of ends of soot deposit is maintained to within 25° C. of the temperature in that region at commencement of deposition.

4. A process according to claim 1, wherein the temperature of the mandrel in a region of ends of the soot deposit is maintained to within 5° C. of the temperature in that region at commencement of deposition.

5. A process according to claim 1, wherein the temperature of the mandrel in any region which is covered by soot deposit is maintained to within 50° C. of the temperature in that region at commencement of deposition.

6. A process according to claim 1, wherein the temperature of the mandrel in any region which is covered by soot deposit is maintained to within 25° C. of the temperature in that region at commencement of deposition.

7. A process according to claim 1, wherein the temperature of the mandrel in any region which is covered by soot deposit is maintained to within 5° C. of the temperature in that region at commencement of deposition.

8. A process according to claim 1, wherein the mandrel is of external diameter greater than 50 mm.

9. A process according to claim 1, wherein the mandrel is of external diameter greater than 100 mm.

10. A process according to claim 1, wherein the mandrel is of external diameter greater than 300 mm.

11. A process according to claim 1, wherein the mandrel is made from metal, and an outer surface thereof, upon which deposition of silica soot takes place, comprises a thin layer of native oxide derived substantially from that metal.

12. A process according to claim 1, wherein the temperature of a selected portion or portions of the mandrel is monitored throughout the deposition process.

13. A process according to claim 12, wherein said selected portions of said mandrel include a region upon which soot is deposited during the deposition process and the region at each end of the soot deposit.

14. A process according to claim 1, wherein particles of silica soot are produced in a flame of at least one synthesis burner and are deposited in a deposition zone having a length extending along a length of said mandrel, and wherein flows of silica precursor material and/or fuel gas to said at least one synthesis burner are adjusted during the deposition process to ensure that the mandrel temperature remains substantially constant and uniform over the entire length of the deposition zone.

15. A process according to claim 14, wherein additional heating is supplied in the vicinity of one or both ends of the silica deposition zone and/or to the mandrel adjacent thereto, by one or more further burners supplied with combustion gases but not with silica precursor.

16. A process according to claim 1, wherein control of mandrel temperature is achieved or facilitated by electrical heating means.

17. A process according to claim 16, wherein the mandrel is hollow and the electrical heating means comprises one or more heating elements disposed within the mandrel.

18. A process according to claim 1, wherein the mandrel is provided with cooling means.

19. A process according to claim 18, wherein the mandrel is hollow and said cooling is provided by a flow of air or other coolant fluid fed to the interior of the mandrel.

20. A process according to claim 1, wherein silica soot particles are produced in a flame of one or more synthesis burners fed with a chlorine-free precursor of silica.

21. A process according to claim 20, wherein the precursor is a siloxane, a silane or an alkoxysilane.

22. A process according to claim 21, wherein the precursor comprises a polymethylsiloxane.

23. A process according to claim 22, wherein the precursor includes octamethylcyclotetrasiloxane, decamethylcyclopentasiloxane or a mixture thereof.

24. A process according to claim 20, wherein the one or more synthesis burners is further supplied with a feed of a volatile chlorine-free organometallic dopant compound.

25. A process according to claim 24, wherein the dopant is a metal alkoxide or chelate.

26. A process according to claim 1, wherein the mandrel is composed of metal.

27. A process according to claim 26, wherein the mandrel is composed of a hollow metal tube.

28. A process according to claim 27, wherein the hollow metal tube contains thermally insulating material.

29. A process according to claim 26, wherein the mandrel is made from a refractory oxidation-resistant metal.

30. A process according to claim 29, wherein said refractory metal is stainless steel, titanium, a titanium alloy or a superalloy.

31. A process according to claim 30, wherein the superalloy comprises Hastelloy, Inconel, Waspaloy, Rene alloys, Haynes alloys, Incoloy or Fecralloy.

32. A process according to claim 26, wherein the metal is protected by a surface coating or treatment to enhance its resistance to corrosion or oxidation.

33. A process according to claim 32, wherein said protection is provided by a layer of metallic oxide or nitride.

34. A process according to claim 33, wherein said layer is applied by means of one or more of: cementation, chemical vapour deposition, ion plating, plasma enhanced vapour deposition, sputtering, and thermal spray coating.

* * * * *